United States Patent
Martens et al.

(10) Patent No.: US 7,384,560 B2
(45) Date of Patent: Jun. 10, 2008

(54) METHOD FOR REDUCING THE SIZE OF METALLIC COMPOUND PARTICLES

(75) Inventors: Johan Martens, Huldenberg (BE); Gina Vanbutsele, Rotselaar (BE); Roger Vermeiren, Schilde (BE)

(73) Assignee: K.U. Leuven Research & Development, Leuven (BE)

( * ) Notice: Subject to any disclaimer, the term of this patent is extended or adjusted under 35 U.S.C. 154(b) by 547 days.

(21) Appl. No.: 10/505,790

(22) PCT Filed: Feb. 26, 2003

(86) PCT No.: PCT/BE03/00033

§ 371 (c)(1),
(2), (4) Date: Jan. 7, 2005

(87) PCT Pub. No.: WO03/072659

PCT Pub. Date: Sep. 4, 2003

(65) Prior Publication Data

US 2005/0127214 A1 Jun. 16, 2005

(30) Foreign Application Priority Data

Feb. 26, 2002 (GB) .................... 0204430.3

(51) Int. Cl.
*C09C 3/04* (2006.01)
*B02C 19/00* (2006.01)

(52) U.S. Cl. .......................................... 210/695; 241/5
(58) Field of Classification Search ............... 210/695; 241/5
See application file for complete search history.

(56) References Cited

U.S. PATENT DOCUMENTS

| 3,133,023 A | 5/1964 | Vogel et al. |
| 6,203,768 B1 | 3/2001 | McCormick et al. |
| 6,410,935 B1 | 6/2002 | Rajh et al. |

FOREIGN PATENT DOCUMENTS

DE 2121769 12/1971

(Continued)

OTHER PUBLICATIONS

Cul and Hahn, "Tensile Deformation of Nanostructured TIO$_2$ at Low Tempatures," Nanostructured Materials 1: 419-425 (1992).

(Continued)

*Primary Examiner*—David A Reifsnyder
(74) *Attorney, Agent, or Firm*—Clark & Elbing LLP

(57) ABSTRACT

Method and apparatus for reducing the average size of metallic compound particles or agglomerates suspended in a fluid by flowing one or more times said fluid having metallic compound particles or agglomerates suspended therein through one or more magnetic fields to reduce the average size of a substantial portion of the metallic compound particles or agglomerates by at least 25%.

19 Claims, 7 Drawing Sheets

FOREIGN PATENT DOCUMENTS

| | | |
|---|---|---|
| EP | 0949217 A1 | 10/1999 |
| GB | 1004570 | 9/1965 |
| GB | 1 474 554 | 5/1977 |
| GB | 2065157 A | 6/1981 |
| JP | 50-116378 | 9/1975 |
| JP | 11-151437 | 6/1999 |
| JP | 2002-001390 | 1/2002 |
| JP | 2006-285363 | 10/2006 |
| WO | PCT/AU96/00539 | 3/1997 |

OTHER PUBLICATIONS

Weiner, "Interactions Among Water Quality Parameters," Applications of Environmental Chemistry, Lewis Publishings, Chap. 3.1, pp. 29-69 (2000).

International Preliminary Examination Report (mailed on Sep. 11, 2003).

International Search Report (mailed on Aug. 6, 2003).

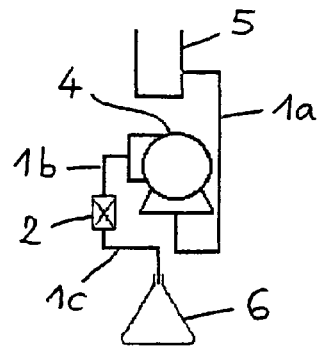
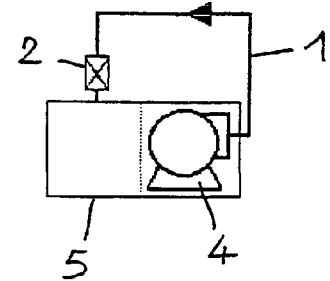
Figure 1A
Figure 1B
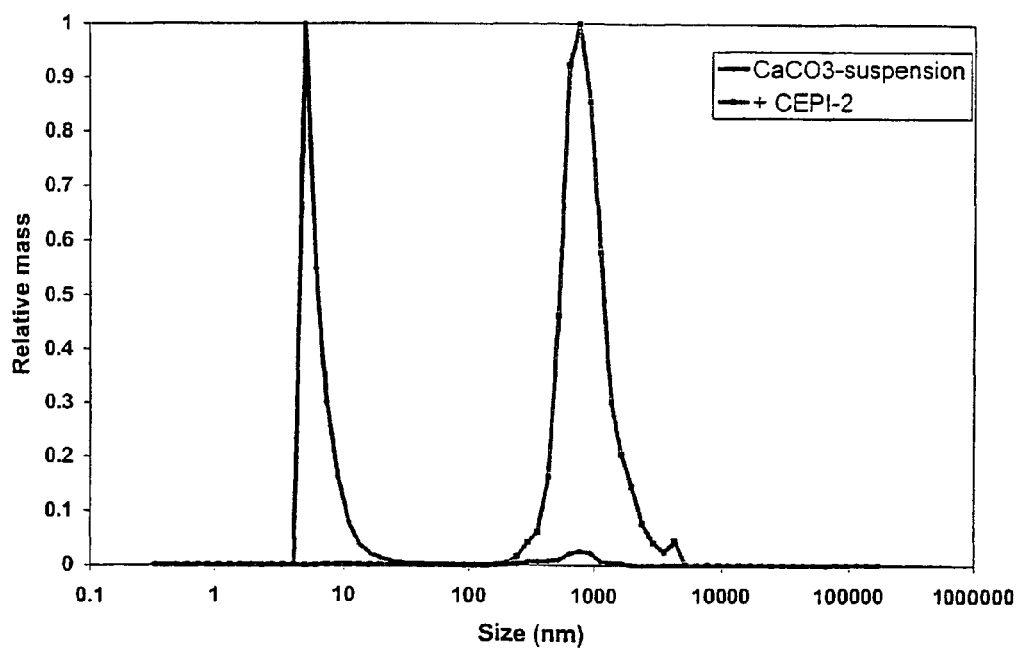
Figure 2

METHOD FOR REDUCING THE SIZE OF METALLIC COMPOUND PARTICLES

CROSS REFERENCE TO RELATED APPLICATIONS

This application is the U.S. National Stage of International Application No. PCT/BE03/00033, filed Feb. 26, 2003, which, in turn, claims the benefit of British patent application 0204430.3, filed Feb. 26, 2002.

The present invention is in the field of the manufacture of particles of metallic compounds of very small size. Particularly, the invention is in the field of metallic oxides, hydroxides and salts in the form of nanoparticles. More specifically, the invention relates to the magnetic treatment of suspensions of particles of metallic compounds. The invention also relates to methods of control of the particle average size and particle size distribution. Finally the invention relates to articles of manufacture incorporating such metallic compound nanoparticles.

BACKGROUND OF THE INVENTION

Ultrafine powders have significant potential for a wide range of applications including catalysts, magnetic recording media, optoelectronic materials, magnetic fluids and composite materials. Materials having fine-scale microstructures possess unique and technologically attractive properties, as shown by work on rapidly solidified metals, alloys and composite materials wherein grain sizes on the order of a few micrometers (microns) are obtainable. Recently, however, research has focused on reducing grain size from the micrometer to the nanometer range. A feature of such nanostructured materials is the high fraction of atoms (up to 50%) residing at grain or particle boundaries. The high fraction of the atoms residing in surface boundaries is important in creating a high density of potential sites for catalytic and electrochemical reactions. Nanostructured materials, which refer herein to materials having a grain diameter of about 1 to 100 nanometers (1 nm=10 angstroms) possess substantially different, and in many cases improved, chemical and physical properties compared to their micron-sized grain counterparts of the same chemical composition.

The synthesis of oxides and hydroxides in nanostructured form facilitates the manufacture of components and devices with modified and/or superior performance. An additional benefit of grain size refinement to the nanoscale range is the elimination of large voids at grain boundaries, which often contribute to deleterious properties. The recent demonstration that nanostructured ceramic materials (i.e., $TiO_2$) can be superplastically deformed at relative low temperatures and pressures, as described in the examples in Nanostructured Materials, Vol. 1, 1992, has important implications in net shape forming brittle ceramic and intermetallic components. In industrial coating applications, for example thermal barrier coatings, reduction to the nanoscale is highly effective in increasing thermal impedance. In dense ceramic coatings, nanostructured materials have the potential to provide high hardness combined with good fracture toughness, and corrosion resistance.

High surface-area materials with nanoscale dimensions are of special interest in applications where active-site mediated chemical reactions play a decisive role. In catalytic applications, a high contact area for oxidation and reduction with the surrounding environment is important, and thus reduction of the catalytic material to the nanoscale is clearly a distinct advantage. Catalytic applications include pollution control, such as nuclear waste mitigation, water purification, mercury remediation, particulates remediation, and air filtration, as well as catalysis for synthetic purposes, such petroleum refinement, and the like. However, despite a strong interest in the development of nanostructured materials for catalytic applications, the present nanostructured materials suffer from the tendency of the particles to form agglomerates in which the interparticle pore space becomes comparable with the particle size, i.e. wherein the interparticle pore space itself has nanoscale dimensions.

Another area for the use nanostructured materials is rechargeable batteries and fuel cells, where the high surface area of the nanostructured materials promotes rapid interactions of the active material with the surrounding media. In high energy density rechargeable storage batteries, for example, the need to sustain high current pulses under charging and discharging conditions requires maximum contact between the electrode and electrolyte to achieve a high density of ion and electron carriers. Active nanostructured materials, with their high density of controlled surface defects, address this requirement, thus providing the means to optimize the high energy storage capacity of batteries.

Work on micron-scale nickel hydroxide-based materials indicates three forms of crystal structure, namely the hexagonal .alpha.- and .beta.-phases and the cubic .gamma.-phase. In nickel electrode applications, the .beta.-phase is usually used because of its stability during charge-discharge cycle process. However, .alpha.-nickel hydroxide, although unstable in the charge-discharge cycle, is capable of storing a higher amount of energy due to a higher valence charge. Current nickel electrodes are less than ideal because of the low volumetric energy density of the active materials. The theoretical x-ray density of nickel hydroxide is 4.15 g/cc, but the present electrode can only achieve a density of 1.8 g/cc. This is primarily due to the large micro-sized voids associated with the processed electrodes when using conventional nickel hydroxide.

The particle size in both naturally occurring and commercially synthesized manganese oxide is on the micron scale. Crystallographic studies reveal that at the molecular level manganese dioxide is constructed from octahedrons, each consisting of six oxygen atoms surrounding a manganese atom. The octahedrons are linked at their vertices and edges to form single or double chains. These chains share corners with other chains, leading to structures with tunnels or channels formed by rows of atomic empty sites. The size of these channels is related to the number of manganese-oxygen chains on each side. The presence of channels facilitates the transport of mobile ionic species, including $Li+$, $H+$, $K+$, $Ba+2$, $Na+$, or $Pb+2$. This feature is important because such cation exchange enhances both catalytic properties for oxidation reactions, and good ionic/electronic conduction for energy storage batteries.

Zirconia is another oxide of particular interest because of its chemical stability, high hardness, refractory nature (ability to withstand high temperatures), and ionic conductivity. Structurally stabilized zirconia is widely used in thermal barrier coatings for advanced engines, which are subject to extremely high temperatures. Other uses of zirconia include milling balls, refractors, oxygen sensors, and fuel cells batteries, as well as electronic ceramics.

Zirconia has a monoclinic structure at low temperatures, but exists in different forms at elevated temperatures. For example, undoped zirconia with the monoclinic structure transforms near 1170° C. to the tetragonal structure, and then near 2370° C. to the cubic structure. The presence of lower-valance cations such as $Mg+2$, $Ca+2$, $Y+3$, and rare earth cations stabilizes the high temperature phases to lower temperatures so that metastable tetragonal or cubic phases can exist down to ambient temperature. Also ZrO2 nanoparticles produced by sol-gel synthesis are heavily agglomerated.

As can be seen by the above discussion, despite recent developments in the synthesis of nanostructured materials, there still remains a need for materials and methods which are economical, and which produce materials which are suitable for a wide range of industrial applications. There remains a particular need for materials suitable for catalytic applications, i.e. materials having a high density of active sites.

A method for the manufacture of ultrafine powders with particle sizes less than 50 nm is described in International Application No. PCT/AU96/00539. This process involves a mechanically activated chemical reaction between a metal compound and a suitable reagent which occurs either during mechanical milling or during subsequent heat treatment of the milled powder. During mechanical activation a composite structure is formed which consists of nano-sized grains of the nano-phase substance within the matrix of the by-product phase. Removal of the by-product phase yields nano particles of the desired material.

The above described prior art techniques require the occurrence of a mechanically activated chemical reaction between the starting powders to form nano-sized particles. Ultrafine grinding processes such as attrition milling are known to be effective in producing powders with mean particle sizes down to about 500 nm. However, the achievement of smaller particle sizes generally requires long milling times and significant energy inputs and is therefore limited by economic considerations. Contamination of the product may also be a problem.

The advent of new methods to prepare semiconductor and metal nanocrystals, specifically the injection of molecular precursors into hot organic surfactants, has yielded markedly improved samples with good size control, narrow size distributions, and good crystallinity of individual and dispersable nanocrystals Using nonhydrolytic preparations of metal oxide nanocrystals at high temperature in organic surfactants, one observes markedly different properties with respect to defect structure and surface composition. Metal oxide nanocrystals with nonhydroxylated surfaces are believed to have significant advantages for applications in catalysis, ceramics, energy storage, magnetic data storage, sensors, ferrofluids, etc.

A method of increasing the refractive indexes of polymers is combining metal oxide particles with polymers to form ceramers. Ceramers may be defined as hardened or cured compositions having ceramic particles embedded or grafted into the polymer matrixes and typically having optical and physical characteristics intermediate between those of the metal oxide and the organic component. Transparency of ceramers is dependent upon, in part, the sizes and refractive indexes of the metal oxide particles contained therein. If the metal oxide particles used in ceramer preparations have large mean diameters, the transparency of the ceramers may be diminished. Light directed at the ceramer containing large metal oxide particles would be reflected back to the light source or deflected to the side, reducing the apparent transparency of the ceramer. Moreover, the transparency of the ceramer may be diminished upon the addition of very small metal oxide particles, if the particles agglomerate within the polymer. These particle agglomerates act as larger particles that may scatter or reflect light. In addition, during the preparation of ceramers, metal oxide particles may precipitate creating what appears to be separate layers(s) that have less than maximal transparency. For a transparent ceramer, the small metal oxide particles must be highly dispersed (non-agglomerated) in the polymer to avoid light scattering.

One method of ceramer preparation is to treat metal oxide particles with specific organic acids, or other surface active agents, before combining the metal oxide particles with polymer precursors. It is through that surface-active agents coat the surface of the metal oxide particles and create an organophilic interface with the polymer compositions. An adsorbed organic layer on the outside of the metal oxide particles sterically inhibits agglomeration resulting in greater metal oxide particle dispersion stability. Another method of increasing the dispersibility of metal oxides in polymer compositions is to electrostatically stabilize the metal oxide particles by forming aqueous colloids. The electrostatically charged layer surrounding the metal oxide particles provides repulsive forces between metal oxide particles inhibiting agglomeration. These methods of dispersing metal oxides suffer from various disadvantages. Consequently, transparent polymer/metal oxide compositions having high refractive indexes are desirable but difficult to obtain because the metal oxide particles, when combined with polymer precursors, may agglomerate and decrease the transparency of the resulting ceramers.

The refractive indexes of ceramers or ceramer compositions are, in part, dependent upon the refractive indexes of the metal oxide particles added to the organic matrix. The theoretical refractive index of a single ceramer can only be as high as the volume weighted average of the refractive indexes of the metal oxide particles and the polymer matrix. Consequently, it is desirable to make ceramers using metal oxide particles having high refractive indexes. Metal oxide particles in crystalline form typically have higher refractive indexes than metal oxide particles that are amorphous (that is, non-crystalline). Therefore, using crystalline metal oxides to make ceramers is desirable, though highly crystalline metal oxide particles that are dispersible are difficult to make because of their tendency to agglomerate in polymer compositions. Generally for a given particle size, the tendency to flocculate increases with increasing refractive index of the particles. For most high refractive index oxides, the form that is precipitated from solution is usually an amorphous or lower refractive index form. Treatments to induce crystallization (for example, heating at an elevated temperature) often tend to induce flocculation or agglomeration of the metal oxide particles. Heating also tends to induce sintering of aggregated of primary particles, especially very small particles that have very high surface areas and thus higher total surface energies. Because of its high dielectric constant, water is an excellent medium for crystallizing and stabilizing metal oxide particles. However, metal oxide particles that are formed in water are difficult to transfer into organic liquids without particle agglomeration and concomitant transfer of water.

Lithium based batteries have become commercially successful due to their relatively high energy density. Suitable positive electrode materials for lithium based batteries include materials that can intercalate lithium atoms into their lattice. The negative electrode can be lithium metal, lithium alloys or compounds that can reversibly intercalate lithium atoms into their lattice. Batteries formed from lithium metal or lithium alloy negative electrodes are referred to as lithium batteries while batteries formed with an anode (negative electrode) active material that can intercalate lithium ions are referred to as lithium ion batteries. In order to produce improved batteries, various materials have been examined for use as cathode (positive electrode) active materials for lithium based batteries. A variety of materials are useful in lithium based batteries. For example, vanadium oxides in certain oxidation states are effective materials for the production of positive electrodes for lithium based batteries. Also, metal vanadium oxide compositions have been identified as having high energy densities and high power densities, when used in positive electrodes for lithium based batteries. Silver vanadium oxide has a particularly high energy density and high power densities, when used in lithium based batteries. Silver vanadium oxide batteries have found particular use in the production of implantable cardiac defibrillators where the battery must be able to recharge a capacitor to deliver large pulses of energy in rapid succession, within ten seconds or less.

Nanoparticles have been reportedly made from metal carbonates such as ZnCO3. The production of such nanoparticles has been reported by methods such as chemical synthesis, gas-phase synthesis, condensed phase synthesis, high speed deposition by ionized cluster beams, consolidation, high speed milling, deposition and sol-gel methods. These methods suffer from numerous drawbacks, including agglomeration, broad particle size distribution, or low volume production.

In all the above-listed fields of industry there is a need for a cost-effective process for making nanoparticles of metallic compounds.

SUMMARY OF THE INVENTION

The deficiencies of the prior art as discussed above are overcome or alleviated by the materials and methods of synthesis of the present invention, wherein nanostructured metallic compounds, including oxides and hydroxides, are produced by cost-efficient means.

The present invention is based on the unexpected finding that a substantial portion of metallic compound particles or agglomerates suspended in a fluid can be significantly reduced in size by flowing one or more times said fluid having metallic compound particles or agglomerates suspended therein through one or more magnetic fields.

BRIEF DESCRIPTION OF THE DRAWINGS

FIG. 1A represents a reservoir system for carrying out a magnetic treatment according to the invention.

FIG. 1B represents a closed system for carrying out a magnetic treatment according to the invention.

FIG. 2 represents the distribution of relative masses of particles in the range from 5 nm to 5 µm of a concentrated calcite suspension before and after a magnetic treatment according to the invention.

DEFINITIONS

Figure 3:
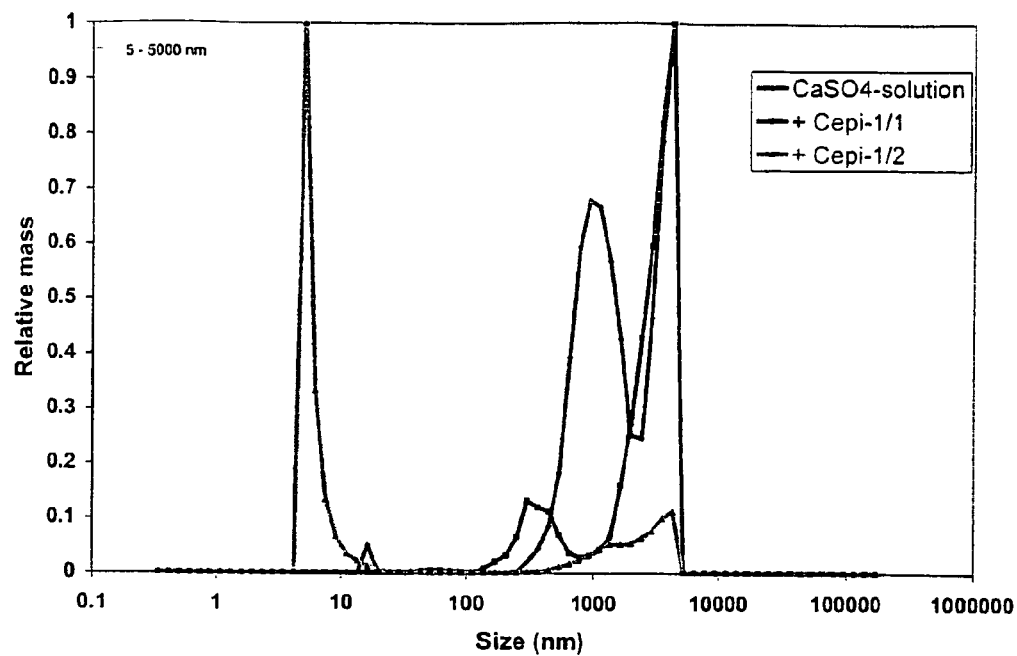
FIGS. 3 and 4 represent the distribution of relative masses of particles in the range from 5 nm to 5 µm of a calcium sulphate suspension before and after a magnetic treatment according to the present invention.

The term "metal complex salt" as used herein refers to a salt wherein the anion, the cation or both are complexes.

The term "particles" as used herein refers to discrete individual units, e.g. crystals, of a metallic compound and being part of a population having an average size within a range usually between about 1 nanometer (nm) and about 10 µm, preferably between 0.45 µm and about 5 µm. The minimum average particle size of 0.45 µm refers to the nominal pore size of a filter used for filtering the total suspended solids (TSS) present in water, as explained by E. Weiner in *Applications of Environmental Chemistry* (2000) page 67 (ed. Lewis Publishers).

The term "agglomerates" as used herein refers to assemblies of particles, being part of a population having an average size within a range usually between about 10 µm and about 100 µm.

The term "nanoparticles" as used herein refers to particles being part of a population having an average size below about 0.45 µm (450 nm), preferably within a range between 1 nm and about 450 nm.

DETAILED DESCRIPTION OF THE INVENTION

In a first embodiment, this invention relates to a method and to apparatus for reducing by at least 25%, preferably at least 50%, more preferably at least 80%, the average size of a substantial portion of metallic compound particles or agglomerates suspended in a fluid by flowing one or more times said fluid having metallic compound particles or agglomerates suspended therein through one or more magnetic fields. The present invention provides an apparatus for reducing the average size of a substantial portion of metallic compound particles or agglomerates suspended in a fluid, comprising: a source of metallic compound particles or agglomerates suspended in a fluid, means for generating one or more magnetic fields, and means for flowing said fluid having metallic compound particles or agglomerates suspended therein one or more times through the one or more magnetic fields. A means for measuring a turbidity of the fluid with metallic compound particles or agglomerates suspended therein may be included. A means for measuring a particle size of metallic compound particles or agglomerates suspended in the fluid may also be provided.

According to the said method, it should be understood that the particles or agglomerates submitted to magnetic treatment include at least metallic compound particles or agglomerates and may optionally include non-metallic particles or agglomerates, e.g. carbon particles like soot particles. However, in the latter case, only the metallic compound particles or agglomerates will be affected in sizes, since to the best of our present knowledge the size of covalent compound particles or agglomerates is not significantly affected by this magnetic treatment, contrary to particles or agglomerates with ionic binding character and/or strong dipoles. Thus, the term "metallic compound" refers to a compound of a metal ion and one or more atoms or groups of atoms, e.g. in the form of ionic bonds and/or ionic complexes. It should also be understood that the effect of the method on the average size is more important when the strength of the magnetic field is higher and/or the number of flows through the magnetic field is higher. Since the strength of each commercially available magnet is usually limited to about 10,000 gauss, a means to increase the effective magnetic field is to flow the suspension through a number of magnets arranged in series (especially for limiting the duration of treatment) and/or to re-circulate the suspension several times through the same magnet(s). Preferably the strength of each said magnetic field used for carrying out the method of the invention is at least about 2,000 gauss.

The metallic compound present in the particles or agglomerates to be magnetically treated according to this invention may be selected from a very wide range of species. In particular, it may be selected from the group consisting of metal oxides, metal hydroxides, metal sulfides, metal selenides, metal tellurides and combinations thereof, wherein the metal may belong to any of groups 1 to 15 of the Periodic Table. Suitable examples include, but are not limited to, zinc oxide, zinc hydroxide, calcium hydroxide, iron oxide, aluminium oxide, titanium oxide, magnesium oxide, manganese oxide, zirconium oxide, nickel hydroxide, vanadium oxide, silver vanadium oxide and the like.

The metallic compound present in the particles or agglomerates to be magnetically treated according to this invention may also be selected from metal organic or inorganic salts or metal complex salts. Suitable examples include, but are not limited to, carbonates, percarbonates, perthiocarbonates, perdicarbonates, perphosphates, perdiphosphates, pergermanates, rhenates, perrhenates, ruthenates, perruthenates, tantalates, pertantalates, technetates, pertechnetates, sulfates, thiosulfates, thiotellurates, sulfites, sulfonates, persulfates, carbides, hydrides, borates, perborates, borohydrides, borosilicates, borotitanates, borotungstates, perchromates, silicates, aluminates, nitrates, nitrites, perazotates, arsenites, arseniates, perarseniates, bromates, bromites, iodates, periodates, iodites, periodohexatungstates, manganates, permanganates, molybdates, permolybdates, perthiomolybdates, vanadates, perthiovanadates, titanates, pertitanates, zirconates, chromates, ferrates, ferricyanates, ferrioxalates, ferrocyanates, ferrofulminates, cobaltocyanates, nickelates, nickelotungstates, platinates, uranates, peruranates, perosmiates, chlorates, perchlorates, chlorites and organic salts (such as citrate, tartrate, acetate, acetylacetonate and the like) of one or more metals of any of groups 1 to 15 of the Periodic Table. Suitable examples of such inorganic salts include, but are not limited to, calcium carbonate, calcium sulphate, molybdenum carbide, tungsten carbide and the like.

Metals of group 1 of the Periodic Table suitable for carrying out the present invention are preferably lithium, sodium and potassium. Metals of group 2 of the Periodic Table suitable for carrying out the present invention are preferably magnesium, calcium and barium. Metals of group 3 of the Periodic Table suitable for carrying out the present invention are preferably scandium and yttrium. Metals of group 4 of the Periodic Table suitable for carrying out the present invention are preferably titanium and zirconium. Metals of group 5 of the Periodic Table suitable for carrying out the present invention are preferably vanadium and tantalum. Metals of group 6 of the Periodic Table suitable for carrying out the present invention are preferably chromium, molybdenum and tungsten. Metals of group 7 of the Periodic Table suitable for carrying out the present invention are preferably manganese, technetium and rhenium. Metals of group 8 of the Periodic Table suitable for carrying out the present invention are preferably iron, ruthenium and osmium. Metals of group 9 of the Periodic Table suitable for carrying out the present invention are preferably cobalt, rhenium and iridium. Metals of group 10 of the Periodic Table suitable for carrying out the present invention are preferably nickel, palladium and platinum. Metals of group 11 of the Periodic Table suitable for carrying out the present invention are preferably copper, silver and gold. Metals of group 12 of the Periodic Table suitable for carrying out the present invention are preferably zinc, cadmium and mercury. Metals of group 13 of the Periodic Table suitable for carrying out the present invention are preferably aluminium, gallium and indium. Metals of group 14 of the Periodic Table suitable for carrying out the present invention are preferably tin and lead. Metals of group 15 of the Periodic Table suitable for carrying out the present invention are preferably antimony and bismuth.

Any of such above individually listed metals may be suitably combined, in the form of either of its currently available isotopes, with any anionic group individually listed herein-above.

Suitable metal salts also include phosphates of one or more metals of any of groups 1 to 11 of the Periodic Table.

When the method of the invention is performed on metallic compound agglomerates (such as above defined), the average size of a substantial portion of said metallic compound agglomerates may be reduced to a range from about 0.45 µm to 5 µm and/or the said substantial portion of agglomerates with reduced size is at least 50% by weight of the suspended agglomerates.

When the method of the invention is performed on metallic compound particles (such as above defined), the average particle size of said metallic compound particles may be reduced to a range from about 0.5 nm to about 500 nm, preferably from 1 to 300 nm, more preferably from 5 to 200 nm, most preferably from 5 to 100 nm and/or the said substantial portion of particles with reduced size is at least 20% by weight of the suspended particles.

The skilled person understands that the extent to which the size of metallic compound particles or agglomerates is reduced depends not only upon the magnetic field strength and the duration of treatment of the suspension including such particles or agglomerates, but also upon other parameters such as, but not limited to, the nature (in particular the ionic binding character and dipole strength) of the metallic compound, the flow rate of the fluid wherein the metallic compound particles or agglomerates are suspended, the concentration of such particles or agglomerates in said fluid, the physical and chemical conditions during treatment, the crystalline form or geometrical shape of the particles, the presence of optional other components in said particles or agglomerates, and so on. All such parameters will now be discussed into further details, being understood that the following teachings allow the skilled person to perform certain variations to each parameter and certain combinations of parameters for achieving the goals of the invention without undue experimental burden.

Preferably the fluid wherein the metallic compound particles or agglomerates are suspended is a liquid under the temperature and pressure conditions prevailing during the magnetic treatment of the invention. More preferably the said fluid is water, although the said fluid may also be an organic solvent, for instance selected from the group consisting of alcohols, esters, ethers, ketones, amides or mixtures thereof, or a combination of such organic solvent(s) with water. There is no particular restriction upon the choice of the particular fluid of interest, which may be adapted to the usual conditions prevailing in the industrial application for which there is a need to significantly reduce the size of metallic compound particles or agglomerates involved. Important is that said metallic compound particles or agglomerates are substantially suspended, not dissolved, in the said fluid, i.e. preferably suspended in the form of a slurry wherein the concentration of said metallic compound particles or agglomerates in said fluid is at least 1.05 times, preferably at least 2 times, the solubility limit of said metallic compound in said fluid under the physical (temperature, pressure) and chemical (pH) conditions prevailing while flowing said slurry through the magnetic field(s). The solubility limit of a certain metallic compound in a certain fluid is a parameter which is either readily available in the literature or which may be easily determined by the skilled person by using techniques well known in the art. It is well known that the solubility limit may be heavily dependent upon temperature and pH, therefore it should first be carefully determined when the literature is silent about its value upon specific temperature and pH conditions. For obvious practical reasons, the upper concentration of the metallic compound particles or agglomerates in the fluid, when the fluid is a liquid, is determined by the necessity to flow the said fluid through the magnetic field(s) at an effective linear flow rate, i.e. is determined by the viscosity of the fluid suspension.

Only for the purpose of illustration, a few numerical values may be given for certain metallic compounds corresponding to widely known, large scale, industrial applications. When the metallic compound is calcium carbonate suspended in the form of an aqueous slurry, its concentration in the said slurry may be from about 50 mg/L to about 15 g/L, preferably from 350 mg/L to 3.5 g/L.

When the metallic compound is calcium hydroxide (e.g. lime) suspended in the form of an aqueous slurry, its concentration (solids content) in said slurry may be from about 2% to about 15% by weight. When the metallic compound is an iron oxide pigment suspended in the form of an aqueous slurry, its concentration (solids content) in said slurry may be from about 0.6% to about 60% by weight.

For certain special applications, the fluid wherein the metallic compound particles or agglomerates are suspended a gas may also be a gas. The nature of the gas may widely depend upon the chemical constitution and reactivity of the metallic compound, in particular the nature of the anion associated with the metal, and the context of the industrial application concerned. For instance, when the metallic compound is calcium carbonate, it may be sprayed in air through the magnetic field. When the metallic compound is a transition metal oxide suitable for use as a catalyst for a chemical reaction, the gas may be oxygen or oxygen-enriched air or a non-oxidising gas or an inert gas, depending upon the said catalytic metallic species should be protected from oxidation or not. The gas may also be an incineration gas or a gasoline combustion gas such as those flowing through the exhaust devices of vehicles.

Whatever the fluid, flowing said fluid through the magnetic field(s) is preferably effected at a temperature below the Curie temperature of the magnetic material used for generating said magnetic field(s), e.g. below about 400° C. for a magnetic device of the Al—Ni—Co type. When the fluid wherein the metallic compound particles or agglomerates are suspended is a liquid, flowing said liquid through said magnetic field(s) is preferably effected at a temperature between the freezing temperature and the boiling temperature of said fluid under the pressure prevailing while flowing said fluid through said magnetic field(s). For instance when said fluid is water under atmospheric pressure, flowing said liquid through said magnetic field(s) is preferably effected at a temperature between about 2° C. and 95° C.

The metallic compound particles submitted to the size reduction treatment of this invention may be of any geometrical shape or crystalline form such as, but not limited to, spherical particles or prismatic particles, as well as cubic, tetragonal, hexagonal and octahedral structures.

For certain industrial applications, it may be advantageous to carry out the method of this invention in such a way that the liquid wherein the metallic compound particles or agglomerates are suspended includes one or more viscosity regulators and/or one or more surfactants of any class well known in the art, e.g. anionic surfactants, non-ionic surfactants or cationic surfactants. In such case, said surfactant may be present in an amount suitable to produce surfactant-capped nanoparticles.

Preferably the method according to the invention involves re-circulating (e.g. in a closed circuit) two or more times the fluid wherein the metallic compound particles or agglomerates are suspended through the magnetic field(s). The number of re-circulation times may be quite high, e.g. up to 10,000 times through one magnetic field, preferably up to 3,000 times through one magnetic field, and may be easily adapted to the specific average size targeted for the specific metallic compound involved in a certain industrial application. It is important that the fluid wherein the metallic compound particles or agglomerates are suspended is flowed or circulated through the magnetic field(s) at a speed which allows the magnetic treatment to effectively perform the size reduction to a significant extent. Preferably, the linear flow rate of said fluid through each said magnetic field is between 0.25 and 25 m/s. In view of the length of the magnetic field, it may be calculated that the residence time of said fluid through each said magnetic field is preferably between 60 microseconds and 10 seconds, depending upon the number or re-circulation times.

A usual consequence of the magnetic treatment of the invention is that the turbidity of the suspension of said metallic compound particles is altered. Depending upon the population of particles or agglomerates (whether large or medium-size) that is more concerned by size reduction and the extent to which such size reduction occurs, turbidity may be reduced or increased, as can be estimated or measured by means of turbidimeters well known in the art. Therefore turbidity can be used as an additional property in order to characterise the resulting particle suspension, as will be described in the following other embodiments of this invention.

In a second embodiment, the invention also provides a method for increasing the intensity of the colour of a material including metallic pigment particles or agglomerates, comprising the step of incorporating metallic pigment particles or agglomerates into said material, wherein the average size of a substantial portion of said metallic pigment particles or agglomerates is a range from about 0.5 nm to 5 µm. According to a preferred embodiment of this method, such metallic pigment particles or agglomerates may comprise one or more metallic compounds (such as defined in the first embodiment of this invention) and may be obtained after flowing one or more times a fluid suspension thereof through one or more magnetic fields. Any metallic compound having pigmentation properties may be used in this method. Suitable examples of such metallic pigments include iron oxide, either in its spherical red form or in its prismatic yellow form. Each particular embodiment of the magnetic treatment of the particles suspension, such as previously disclosed for the first embodiment of this invention, may be used within the scope of the method for increasing colour intensity. Preferably, said metallic pigment particles or agglomerates are incorporated into the material at a concentration from about 0.5 to about 3% by weight of said material. In this second embodiment of the invention, a significant increase in colour intensity does not require such a substantial portion of metallic particles to be reduced in size as other industrial applications. From a practical point of view, it is usually sufficient that said substantial portion is at least 20% by weight of the metallic pigment particles involved in the magnetic treatment.

Suitable examples of materials concerned by the second embodiment of the invention include solid materials such as building materials, e.g. concrete, thermoplastic and thermosetting polymers and copolymers of all types, powder paints, rubbers, elastomers, bitumens and the like; liquid materials and gels. As a result, the invention also provides a material, such as a concrete, including metallic pigment particles with increased colour intensity, being obtainable by a method such as above defined.

In a third embodiment, the invention also provides an industrial process involving the use of metallic compound particles or agglomerates, comprising a step of reducing by at least 25%, preferably at least 50%, more preferably at least 80%, the average size of a substantial portion of said metallic compound particles or agglomerates, wherein said step includes a method as described with respect to the first embodiment of the invention. Such an industrial process may further comprise one or more post-processing steps performed following the size reducing step.

Said post-processing step may be a heating step. For instance, when the metallic compound is a metal hydroxide, said heating step may be conducted so as to raise the temperature of the particles or agglomerates with reduced size sufficiently for converting said metal hydroxide into the corresponding metal oxide. In another example, said post-processing step may be a drying step for substantially removing the fluid in which the metallic compound particles or agglomerates are suspended during the size reducing step. Such drying step, which can be performed by any known drying techniques, may be required for providing dried smaller particles to a subsequent step of the said industrial process. Due to the size reduction previously performed by the magnetic treatment of this invention, dried particles with high BET surface area, e.g. from about 2 to about 400 m²/g, may be achieved.

In another variant of the third embodiment of the invention, the post-processing step may be a step of mixing one or more adjuvants or additives together with the optionally dried particles or agglomerates with reduced size. For instance, the adjuvant or additive may be an electrical conductive powder. Mixing such kind of adjuvant or additive may be performed by ball milling or other mixing techniques well known to the skilled person. According to another example, the adjuvant or additive may be a polymer suitable for ceramer preparation. According to yet another example, the adjuvant or additive may be a polymerisable alkene matrix monomer suitable for dental and medical restoration.

In yet another variant of the third embodiment of the invention, the metallic compound is a semiconductor and said post-processing step is a step of forming a metallic deposit onto the metallic compound particles or agglomerates with reduced size, e.g. by a method such as disclosed in U.S. Pat. No. 6,410,935, the resulting product being an article of manufacture for nanolithography applications.

In yet another variant of the third embodiment of the invention, the post-processing step may be a step of diluting the suspension of metallic compound particles or agglomerates with reduced size through the addition of a fluid into said suspension. For instance, the fluid used in said diluting step may be miscible with (e.g. the same as) the fluid present in the size reduction step.

For quality control purpose, the industrial process of the third embodiment of the invention may further comprise one or more steps of controlling the size of metallic compound particles or agglomerates produced during or after the magnetic treatment method, i.e. the method constituting the first embodiment of the invention. In view of the order of magnitude of the particle sizes involved, said size controlling step is preferably performed by dynamic light scattering analysis. When said industrial process comprises a post-processing step performed following the size reduction step, it may further comprise one or more steps of controlling the size of metallic compound particles or agglomerates produced during or after said post-processing step, in which case said size controlling step after said post-processing step may be performed by dynamic light scattering analysis. The size controlling step may be performed in such a way as to measure the average size and/or the size distribution of the particles produced during the various steps of said industrial process.

In yet another variant of the third embodiment of the invention, the post-processing step may be a sonication step.

For quality control purpose, the industrial process according to the third embodiment of the invention may further comprises one or more steps of controlling the turbidity of the suspension of metallic compound particles or agglomerates involved in said process. This turbidity controlling step may be suitably performed by means of any type or turbidimeter available to those skilled in the art.

In a fourth embodiment, the invention also provides a method for evaluating the performance of a magnetic treatment comprising flowing a fluid having metallic compound particles or agglomerates suspended therein through one or more magnetic fields, comprising the steps of:

(i) controlling the size of said metallic compound particles or agglomerates suspended in said fluid before said magnetic treatment, (ii) flowing one or more times said fluid having metallic compound particles or agglomerates suspended therein through said one or more magnetic fields, and
(iii) controlling the size of said metallic compound particles or agglomerates suspended in said fluid after said magnetic treatment.

For instance the size controlling step (i) and/or the size controlling step (iii) of this method may be performed in such a way as to measure the average size and/or the size distribution of particles involved in this magnetic treatment.

In a fifth embodiment, the invention also provides a method for evaluating the performance of a magnetic treatment comprising flowing a suspension of metallic compound particles or agglomerates in a fluid through one or more magnetic fields, comprising the steps of:
(i) controlling the turbidity of said suspension of metallic compound particles or agglomerates before said magnetic treatment,
(ii) flowing one or more times said suspension of metallic compound particles or agglomerates in a fluid through said one or more magnetic fields, and
(iii) controlling the turbidity of said suspension of metallic compound particles or agglomerates after said magnetic treatment.

For instance the turbidity controlling step (i) and/or the turbidity controlling step (iii) of this method may be performed by determining the proportion of light, e.g. infrared light, absorbed by said suspension from a transmitted light beam.

The invention also relates to populations of certain metallic compound, e.g. metallic oxides or hydroxides, such as above described, with an average particle size between about 1 nm and about 40 nm, preferably between about 2 nm and about 20 nm, more between about 3 nm and about 15 nm, and/or with a narrow particle size distribution (e.g. a polydispersity from about 1.1 to about 4.0, preferably from about 1.2 to about 3.0, more preferably from about 1.3 to about 2.0), namely with respect to metallic compounds which have never been able to be produced in such small particle sizes and/or such narrow particle size distribution. Such metallic compound particle populations may be isolated from the particles obtainable from the magnetic treatment of the invention by performing, after said magnetic treatment, a separation step by means of techniques well known in the art, such as ultracentrifugation, ultrafiltration or nanofiltration with the aid of permeable membranes.

The present invention shows a number of advantages over the methods of the prior art. First it achieves substantial size reduction of particles and agglomerates of a huge number of metallic compounds, provided that the latter exhibit a predominantly ionic, not covalent character. Secondly, this size reduction is achieved by means of inexpensive readily available magnetic devices of any type, which may be combined in a number of ways for fine tuning the extent of size reduction that is targeted. Thirdly, the methods of the invention, and the nano-size materials resulting therefrom, may be used in a huge number of different fields or included in a huge number of articles of manufacture such as rechargeable batteries, fuel cells, chemical catalysts, magnetic recording media, optoelectronic materials (e.g. X-ray photoresists), composite materials, ceramics, semiconductors, toner compositions, cleaning devices for exhaust gases, etc.

The instant invention also relates to use in the medical and dental fields, as in bone cements and dental restoratives, because of the high strength, hardness, substantially zero shrinkage, excellent adhesiveness and transparency or translucency of the composites, they can be used in other applications such as adhesives for woods, metals, and the like, or for forming resistant optical coatings and plaques. In this field, the present invention may be carried out using any metal capable of forming amphoteric metal oxides to form the metal oxide nanoparticles, such as tantalum, niobium, indium, tin and the like. Tantalum is particularly desired for dental and medical uses since it will provide X-ray opaque materials necessary for subsequent review of the treated site; i.e., tooth or bone.

This invention relates to a method of semiconductor assisted metal deposition and article of manufacture for nanolithography applications, especially where the formation of metal patterns of high resolution is important, such as in the electronics industry. More particularly, the invention relates to a method for forming a metallic deposit in a precise pattern on a semiconductor, such as titanium dioxide, by use of a surface modifier deposited on the semiconductor. Preferably, the semiconductor is of nanoparticle size, and the modifier is selected to provide both a hole (in the electronic sense) scavenging and chelating effect. The metal is applied in the form of ions which are subsequently reduced by a photocatalytic action. Preferably, the metal is copper, silver, or gold.

The following examples are provided for illustrating the principles and methods of the invention but should not be construed as limiting the scope of the invention in any way.

EXAMPLE 1

Magnetic Treatment of a Concentrated Calcite Suspension

Magnetic treatment of a concentrated calcite suspension was effected in the reservoir system shown in FIG. 1A, comprising a tubing (1a,1b,1c) commercially available from Cole-Parmer Instrument Company (Vernon Hills, Ill., U.S.A) under the trade name Masterflex Tygon I/P 70; an internal magnet (2) of the Al—Ni—Co type, commercially available from CEPI-CO (Antwerp, Belgium) under the trade name "W, SAN R1/4D" and providing a strength of about 10,000 gauss; a pump (4) commercially available from Cole-Parmer Instrument Company under the trade name Masterflex I/P; a reservoir (5) for receiving the suspension to be treated; and a vessel (6) for receiving the magnetically treated suspension. The tubing (1b,1c) was attached to the pump (4) in such a way that the magnet (2) was in a downstream direction.

21 g of $CaCO_3$ (precipitated calcite, available from Merck, with an average particle size above 5 μm) was suspended in 6 L de-ionised water (thus resulting in a concentration of 3.5 g/L) at 21° C. Calcite particles were kept in suspension in the reservoir (5) by agitating with a mechanical stirrer with propeller (not shown on the figure) so that mixing can be continued during magnetic treatment. First, about 2 L of the suspension were flowed through the magnet (2) and, after being received in the vessel (6), poured back into the reservoir (5). Subsequently, 3.5 L of the suspension were flowed again through the magnet (2), i.e. the suspension was flowed two times through the magnetic device at a linear flow rate of 5.9 m/s and with a residence time of the suspension through the magnetic field of 500 μs. Finally, a 2 L magnetically treated sample was collected, visually still showing a substantial sedimentation of particles and a higher turbidity than the untreated suspension. After overnight storing and settling of the largest particles fraction, DLS measurements were performed by means of a He—Ne laser high performance particle sizer (2.5 mW) commercially available from ALV (Germany). DLS results are reported in FIG. 2 showing the distribution of relative masses of particles in the range from 5 nm (being the detection limit of the particle sizer used) to 5 μm in the suspension after treatment (referred to as CEPI-2) and before treatment (referred to as CaCO3 suspension). FIG. 2 shows that the supernatant of the settled treated suspension contains particles with sizes distributed around 1 μm which do not settle under gravity, whereas the absence of a DLS signal in the nanometer range in this sample indicates that on a mass basis, the concentration of micron size particles was much larger than that of nanometer size particles. The supernatant of the untreated suspension did not contain particles in the micrometer range but comprised larger settled particles and very fine particles in the nanometer range.

EXAMPLE 2

Magnetic Treatment of a Calcium Sulphate Suspension

Figure 4:
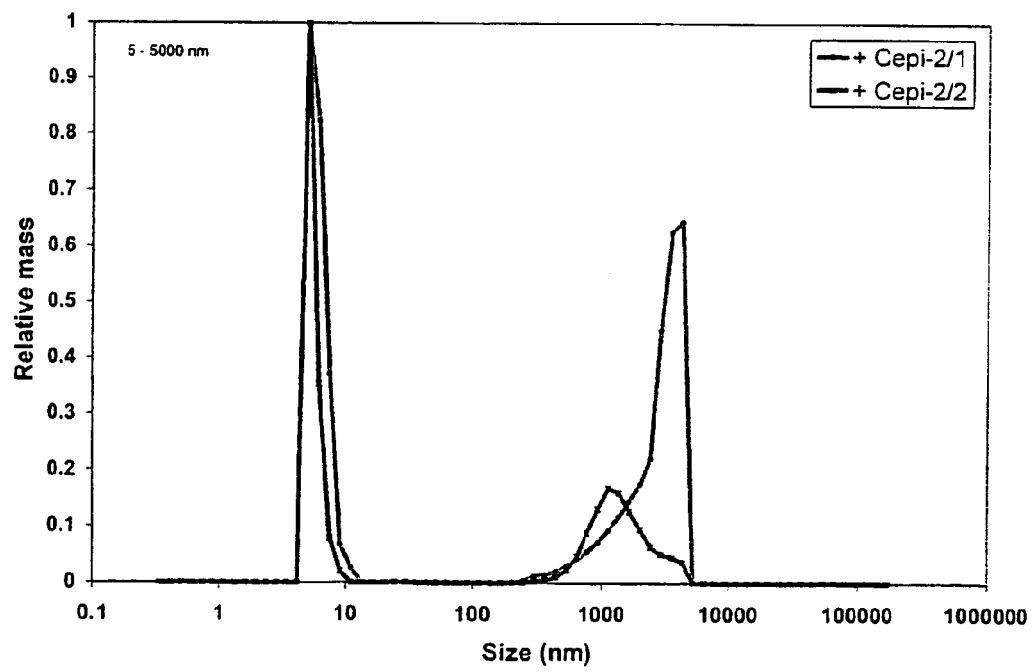

Magnetic treatment of a calcium sulphate suspension was effected as follows in the reservoir system shown in FIG. 1A. 14.47 g $CaSO_4.2H_2O$ (available from Merck) was dispersed by mixing in 7 L de-ionised water in a reservoir (thus resulting in a concentration of 2 g/L at 21° C., yielding a pH value of 7.57. 1.5 L of the suspension was flowed once through the same magnet as in example 1 at a linear flow rate of 5.9 m/s and with a residence time of the suspension through the magnetic field of 250 μs before taking two 200 mL samples (referred to as Cepi-1/1 and Cepi-1/2 in FIG. 3) having pH values of 7.70 and 7.69, respectively. One hour later, the sampling procedure was repeated (samples referred to as Cepi-2/1 and Cepi-2/2 in FIG. 4) having pH values of 7.75 and 7.76, respectively. After performing DLS analysis as in example 1, the distribution of relative masses of particles in the range from 5 nm to 5 μm of these samples were reported in FIG. 3 (together with the untreated starting solution) and FIG. 4. The untreated starting suspension contains particles of about 5 μm and particles of about 1 μm. The formation of particles below about 10 nm and the reduction of the proportion of micron size particles are quite apparent in all magnetically treated samples.

EXAMPLE 3

Turbidity Measurements after Magnetic Treatment of a Calcite Slurry

Magnetic treatment of a concentrated calcite suspension was effected in the closed system shown in FIG. 1B, comprising a ¾ inch tubing (1); an external magnet (2) of the Nd/Fe/B type, available from CEPI-CO (Antwerp, Belgium) and providing a strength of about 10,000 gauss; a pump (4) commercially available from Cole-Parmer Instrument Company under the trade name Masterflex I/P and disposed inside a reservoir (5) with a capacity of 3 L for receiving the suspension. The tubing (1) was attached to the pump (4) in such a way that the magnet (2) was in a downstream direction.

9 g of calcite (available from Merck, average particle size about 10 μm) was introduced into running distilled water, thus resulting in a concentration of 3 g/L. A reference sample (referenced as blank in FIG. 5) was collected immediately. The calcite suspension was then circulated (1,380 times) through the magnet (2) for 23 hours at a linear flow rate of 0.8 m/s. The turbidity change of the suspension was measured by means of the device shown in FIG. 15 wherein an infrared light beam with a wavelength of 880 nm from a light source (15) is sent through the sample, the latter being held in 10 ml glass bottles (16) closed by a cap (11) in a hole (13) of an aluminium block (12). The transmitted light intensity was quantified by the voltage of a photodiode detector (14): the lower the voltage, the higher the turbidity.

Figure 5:
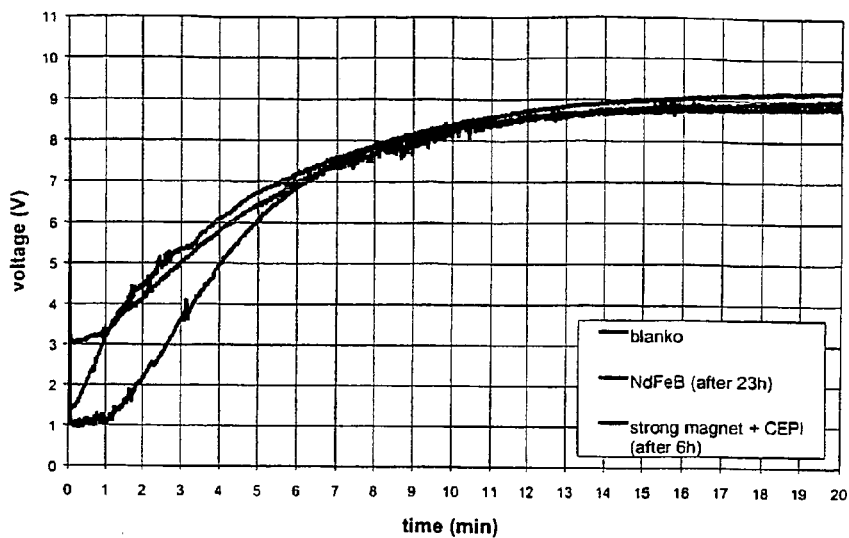
FIG. 5 represents the evolution, as a function of time, of the voltage measured in the turbidity determination of a calcite suspension before and after magnetic treatments with different magnets according to the invention.

The turbidity of the reference sample and of the magnetically treated sample are compared in FIG. 5. The treated sample was less turbid (initial voltage of 1.5 mV compared to 1 mV), indicating that the concentration of light scattering particles was smaller. The critical particle size for obtaining scattering is about 80 nm at a 880 nm wavelength. The higher initial voltage indicates that a substantial fraction of the calcite particles was reduced in size below 80 nm. The treated sample also showed a quicker rise in voltage than the reference, indicating the presence of less large particles, followed by a slower evolution towards the final voltage value (in the blank experiment, the final voltage was reached after 20 minutes instead of 30 minutes in the treated sample), indicating the presence of another fraction of particles that settle under gravitational force but which are smaller than in the reference. This shows that magnetic treatment converted the initial calcite into three populations of widely different size fractions:
- a population of particles with sizes below 80 nm not giving rise to turbidity,
- a population of particles of about 1 μm slowly settling under the gravitational force, and
- a population of particles larger than 10 μm.

The above experiment was continued by repacing the Nd—Fe—B external magnet with a combination of the latter and the internal magnet of example 1 arranged in series. The slurry was sampled after 6 hours of magnetic treatment for turbidity investigation, as shown in FIG. 5. Initially the sample is much less turbid (voltage of 3 mV compared to 1 mV with the blank sample), thus showing the transformation of a significant fraction of calcite into nanometer size particles. The evolution toward the final voltage occurred slower than with the blank sample, showing that particles in the micron range were significantly reduced in size during magnetic treatment.

EXAMPLE 4

Turbidity Measurements after Magnetic Treatment of a Calcite Slurry

Recirculation of a suspension of 9 g calcite (available from Merck) in 3 L de-ionised water (thus resulting in a concentration of 3 g/L) was effected in the closed system shown in FIG. 1B, except that the external magnet was replaced with the internal magnet of example 1, the linear flow rate through the magnet being 7 m/s.

Figure 6:
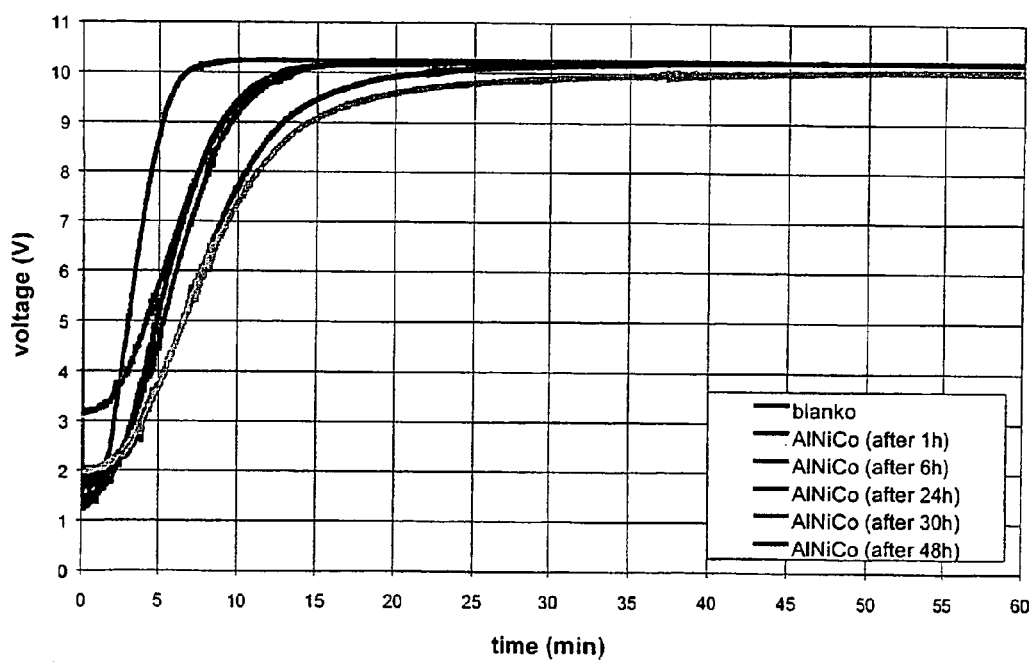
FIG. 6 represents the evolution, as a function of time, of the voltage measured in the turbidity determination of a calcite suspension before and after magnetic treatments with various durations according to the invention.
Figure 15:
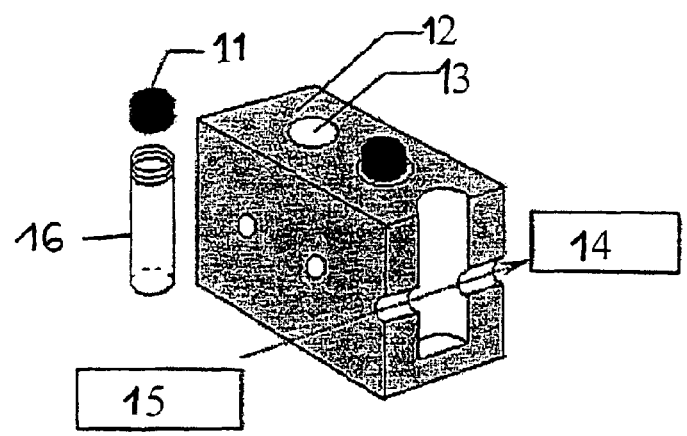
FIG. 15 schematically represents a turbidimeter for monitoring changes in a suspension before and after magnetic treatments according to the invention.

The suspension was allowed to settle while the turbidity changes were monitored, by means of the device schematically described in FIG. 15, after different treatment durations ranging from 1 to 48 hours (each hour of treatment corresponds to flowing the suspension 60 times through the magnet, and each re-circulation involves a residence time of 210 μs of the suspension through the magnetic field), as shown in FIG. 6. Calcite particles in the untreated suspension (blank) settle fastest, then settling takes gradually more time. The initial turbidity decreased (i.e. initial voltage increased) gradually from blank (voltage 1.3 V) to increased treatment time (2.0 V after 30 hours, 3.2 V after 48 hours), indicating that a substantial part of the suspended particles was reduced in size below the detection limit of the turbidimeter (about 80 nm).

EXAMPLE 5

Magnetic Treatment of a Red Iron Oxide Pigment Dispersion in a Closed System

Figure 7:
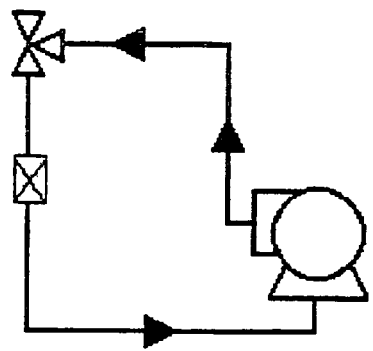
FIG. 7 represents a closed system for the magnetic treatment of a dispersion according to the invention.

Magnetic treatment of a red iron oxide pigment dispersion was effected in the closed system shown in FIG. 7, having a total volume of 100 ml and consisting of a tubing (1*a*,1*b*) commercially available from Cole-Parmer Instrument Company (Vernon Hills, Ill., U.S.A) under the trade name Masterflex Tygon I/P 70; an internal magnet (2) of the Al—Ni—Co type, commercially available from CEPI-CO (Antwerp, Belgium) under the trade name "W, SAN R1/4D" and providing a strength of about 10,000 gauss; a 3-way horizontal ball valve (3) commercially available from Georg Fischer Rohrleitungssysteme AG (Schaffhausen, Switzerland) under the trade name 343DN10/15; and a pump (4) commercially available from Cole-Parmer Instrument Company under the trade name Masterflex I/P. The tubing (1*a*) was attached to the pump (4) in such a way that the magnet (2) was in a downstream direction.

The red iron oxide pigment aqueous dispersion treated in this experiment has a concentration of dry solids of 60% by weight, a viscosity of about 400 mPa.s, a density of 1.9 g/cm$^3$, a pH of about 8.5, and comprises spherical particles with a particle density of 5 g/cm$^3$, and being stabilised by an anionic surfactant. The flow rate applied in this experiment is 4,7 L/minute, which corresponds to a linear velocity of 11 m/s and a residence time of 0.38 s of the suspension through the magnet. Because the volume treated in this closed system is limited, heat generated by the pump causes the temperature of the pigment dispersion to rise up to about 50° C.

DLS analysis of the dispersion particles is performed with the same particle sizer as in example 1, water being used as a standard reference for viscosity. Samples are diluted 100 times with water immediately before measurement. The DLS-plots are not corrected for viscosity, therefore sizes are only relative instead of absolute, but approximating the absolute values because of the high dilutions applied.

Figure 9:
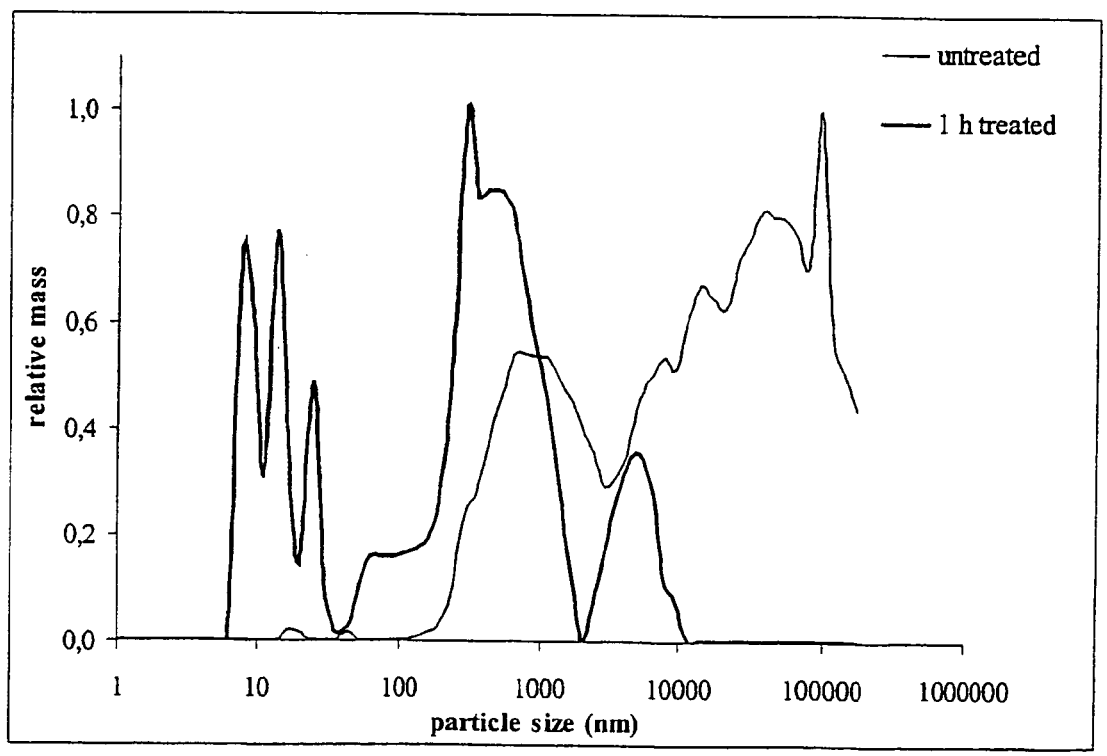
FIG. 9 represents the distribution of relative masses of particles in the range from 5 nm to about 100 µm of a red iron oxide pigment dispersion before and after a magnetic treatment according to the invention.

FIG. 9 represents the distribution of relative masses of particles in the range from 5 nm to about 100 µm of the red iron oxide pigment dispersion before and after one hour magnetic treatment. FIG. 9 shows two types of particle size reductions after treatment:

first, the relative mass of agglomerates (between 10 µm and about 100 µm) is sharply reduced and the relative mass of large particles (between about 1 µm and 10 µm) is significantly reduced after 1 hour treatment.

secondly, the relative mass of particles below 1 µm, especially between 5 and 100 nm, is sharply increased after 1 hour treatment.

The DLS data shown in FIG. 9 are also used for calculating particle size reduction. DLS generates a set of weight values for discrete particle size intervals. Each relative mass value corresponds with a range of particle sizes. The average size is the size at which 50% of the mass is in smaller particles and 50% is in larger particles. A minimum value of 100 nm is used in the following calculations, the sample fraction with very low particle sizes being left out of the average particle size calculation. An artefact peak at very high particle sizes (here 79 µm), being caused by mathematical processing of the DLS-computer, is also excluded from the calculation. Under such conditions, the calculated average particle sizes are 8.74 µm (untreated sample) and 507 nm (after 1 hour treatment), i.e. a 94% particle size reduction after 1 hour (2,820 passes or re-circulation times).

EXAMPLE 6

Magnetic Treatment of a Red Iron Oxide Pigment Dispersion in a Reservoir System

Figure 8:
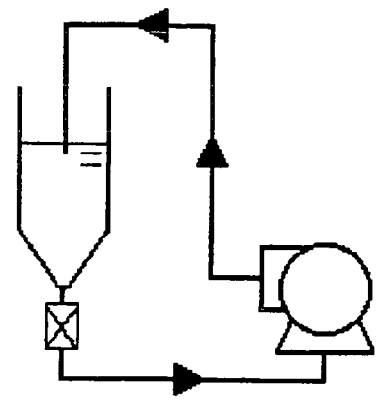
FIG. 8 represents a reservoir system for the magnetic treatment of a dispersion according to the invention.

Magnetic treatment of a red iron oxide pigment dispersion was effected in the reservoir system shown in FIG. 8, comprising a 2-litre reservoir (5) with a conical bottom to which the same magnetic device (2) as used in example 6 is connected by the same tubing (1*a*) in such a way that the magnet (2) is in a downstream direction. The tubing (1*a*,1*b*) re-circulates the pigment dispersion to the top of the reservoir (5) by means of the same pump (4) as used in example 5. In this experiment approximately 250 ml of a pigment dispersion is poured into the reservoir (5) and the same flow rate is applied as in example 5. Warming of the dispersion owing to heat dissipation by the pump during treatment is less pronounced in this system than in the closed system of example 5. In this embodiment, the linear flow rate of the suspension was 11 m/s and the residence time of the suspension through each magnetic field was 136 µs.

The same red iron oxide pigment aqueous dispersion as in example 5 was treated in this reservoir system and the particle size distribution was determined, DLS analysis of the dispersion particles being performed with the same particle sizer as in example 1, and water being used as a standard reference for viscosity. Samples are diluted 10 times with water immediately before measurement. The DLS-plots are not corrected for viscosity, therefore sizes are only relative instead of absolute, but approximating the absolute values because of the high dilutions applied.

Figure 10:
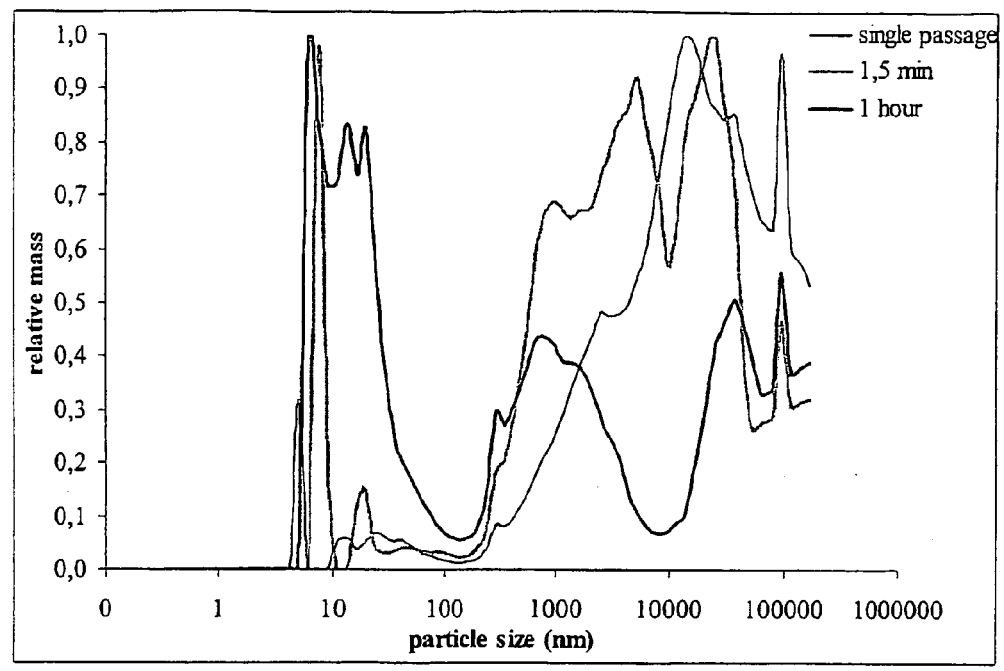
FIG. 10 represents the distribution of relative masses of particles in the range from 5 nm to about 100 µm of a red iron oxide pigment dispersion before and after two magnetic treatments of different durations.

FIG. 10 represents the distribution of relative masses of particles in the range from 5 nm to about 100 µm of the red iron oxide pigment dispersion before and after 1.5 minute and 1 hour magnetic treatment respectively. The phenomena observed in example 5 are confirmed in this experiment involving a reservoir system, as shown in FIG. 10, i.e. a significant reduction of the amount of micrometer particles and a very strong increase of the amount of nanosized particles. Even a short treatment of 1.5 minute already results in a significant particle size reduction.

The DLS data shown in FIG. 10 are also used for calculating particle size reduction, using the same methodology as in example 5. Under such conditions, the calculated average particle sizes are 11.5 µm (untreated sample), 4.91 µm (after 1.5 minute treatment and 2.34 µm (after 1 hour treatment), i.e. a 57% particle size reduction after 1.5 minute (28 re-circulation times) and a 80% particle size reduction after 1 hour (1,128 re-circulation times).

EXAMPLE 7

Magnetic Treatment of a Yellow Iron Oxide Pigment Dispersion in a Closed System

Magnetic treatment of a yellow iron oxide pigment dispersion was effected in the closed system shown in FIG. 7. The yellow iron oxide pigment aqueous dispersion treated in this experiment has a concentration of dry solids of 50% by weight, a viscosity of about 350 mPa.s, a density of 1.6 g/cm$^3$, a pH of about 8.5, and comprises prismatic particles with a particle density of 4 g/cm$^3$, and being stabilised by an anionic surfactant. The flow rate applied in this experiment is 4.7 L/minute, which corresponds to a linear velocity of 11 m/s through the magnetic field. DLS analysis of the dispersion particles and average particle size calculations were performed as in example 6, except that samples were diluted 10 times with water immediately before measurement.

Figure 11:
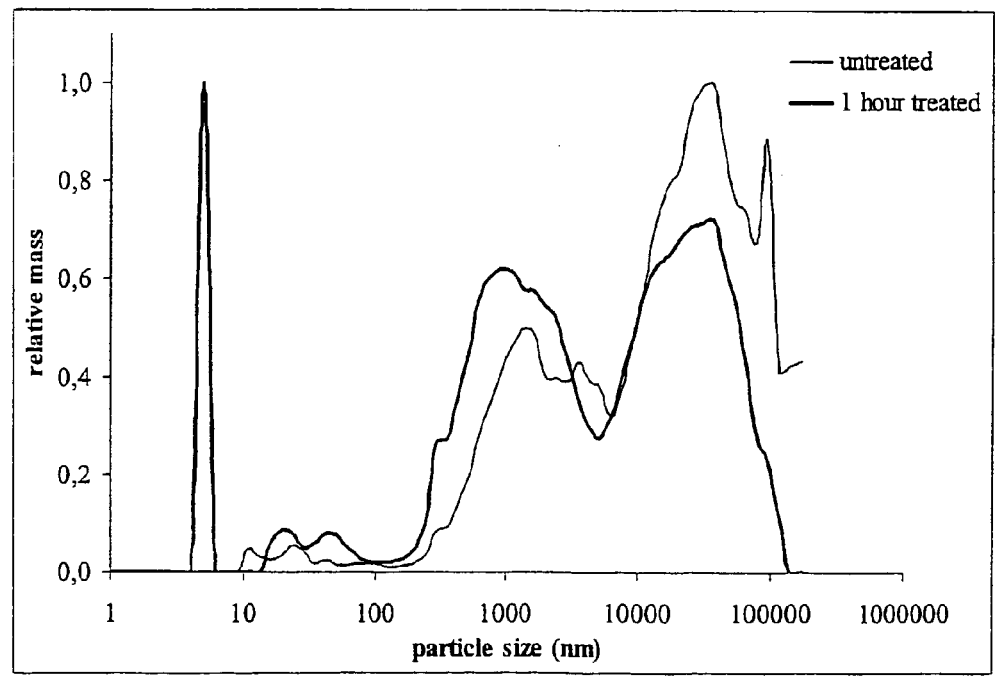
FIG. 11 represents the distribution of relative masses of particles in the range from 5 nm to about 100 µm of a yellow iron oxide pigment dispersion before and after a magnetic treatment according to the invention.

FIG. 11 represents the distribution of relative masses of particles in the range from 5 nm to about 100 μm of the yellow iron oxide pigment dispersion before and one hour after magnetic treatment. FIG. 11 shows a sharp increase in the amount of nanosized particles, especially between 5 and 100 nm, upon treatment. In the treated sample the most abundantly present particle size, even on a mass base, is 5 nm (relative dimension). Also a significant reduction of the number of aggregates (between 10 and 100 μm) is observed. The calculated average particle sizes are 13.2 μm (untreated sample) and 5.72 μm (after 1 hour treatment), i.e. a 57% particle size reduction after 1 hour (2,820 passes or re-circulation times).

EXAMPLE 8

Magnetic Treatment of a Yellow Iron Oxide Pigment Dispersion in a Closed System

The same yellow iron oxide pigment aqueous dispersion was treated as in example 7. DLS analysis of the dispersion particles and average particle size calculations were performed as in example 5, i.e. samples were diluted 100 times with water immediately before measurement.

Figure 12:
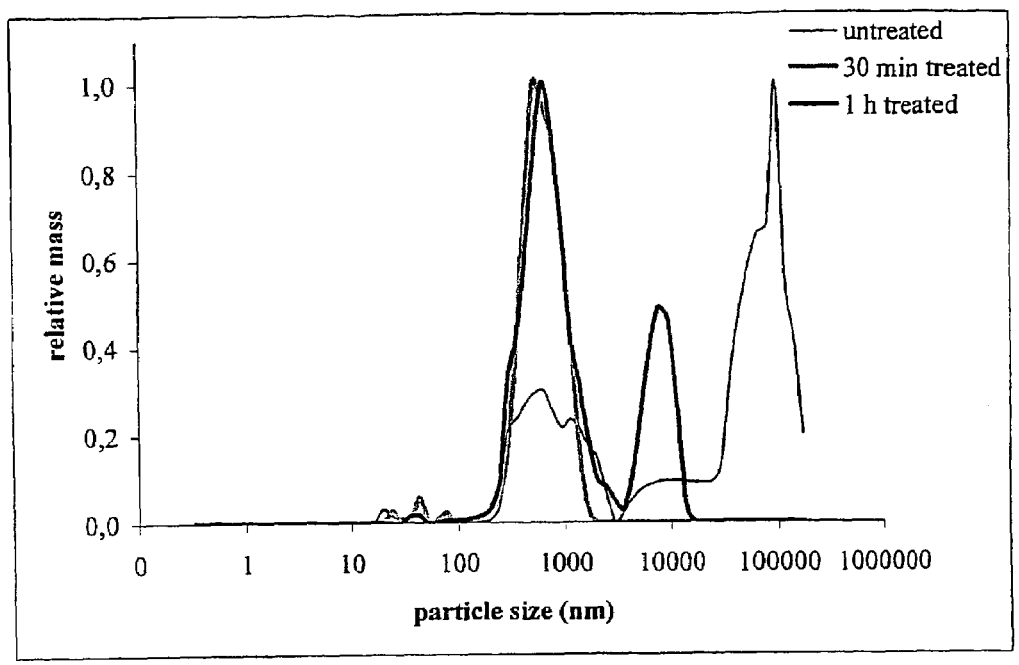
FIG. 12 represents the distribution of relative masses of particles in the range from 5 nm to about 100 µm of a yellow iron oxide pigment dispersion before and after two magnetic treatments of different durations.

FIG. 12 represents the distribution of relative masses of particles in the range from 5 nm to about 100 μm of this yellow iron oxide pigment dispersion before treatment and 30 minutes or one hour after magnetic treatment. The reduction of the amount of micrometer particles is most obviously shown in FIG. 12. An increase of the relative importance of the particles sized between about 200 nm and 3 μm in comparison with larger particles is also shown, suggesting the disruption of physical aggregates into individual particles. A comparison of these results with those of FIG. 11 shows a strong influence of post-treatment dilution on the particle sizes, possibly because the stability of the nanosized particles may be critical: such particles were clearly seen after 10 times dilution, but disappeared after 100 times dilution.

The calculated average particle sizes are 12.1 μm (untreated sample), 560 nm (after 30 minutes treatment) and 5.74 μm (after 1 hour treatment), i.e. a 95% particle size reduction after 30 minutes (1,410 re-circulation times) and a 52% particle size reduction after 1 hour (2,820 re-circulation times).

EXAMPLE 9

Diffuse Reflectance Spectroscopic Analysis of a Pigmented Concrete

A ready made dry concrete pre-mixture of sand, cement and gravel was filtered in order to retain only particles with a diameter of less than 1,25 mm. 400 g of the filtered concrete is mixed with 60 ml of tap water. After mixing with a spoon, 6 ml of the yellow iron oxide pigment aqueous dispersion used in examples 7 and 8 (being either untreated or magnetically treated 5.5 hours beforehand in the closed system shown in FIG. 7) is added to the concrete. Once again the sample is mixed and left to harden for at least 12 hours.

Figure 13:
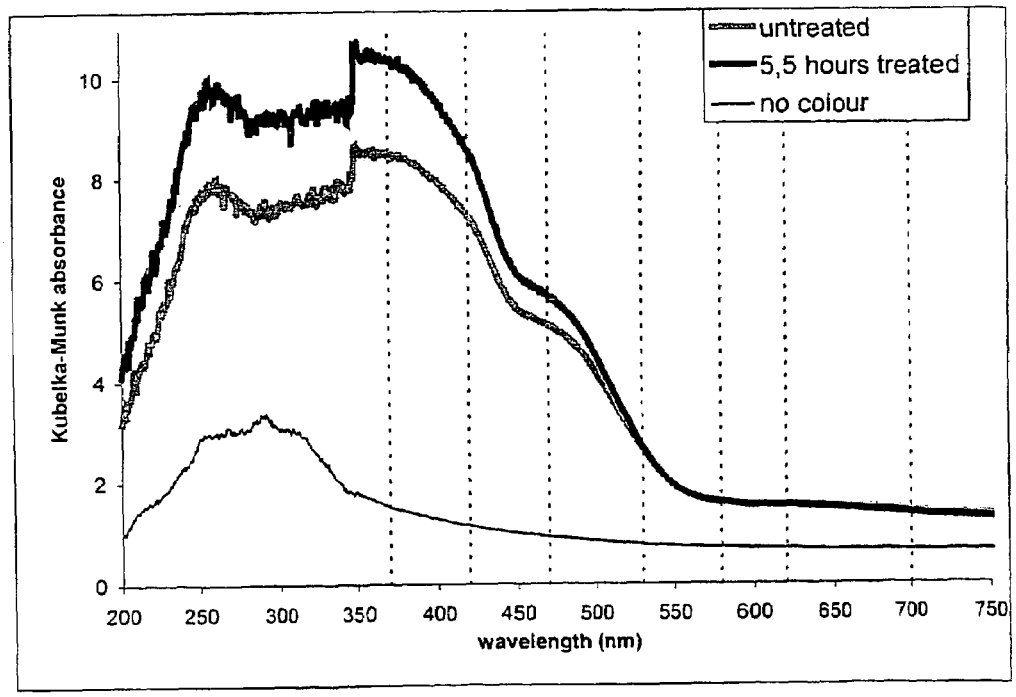
FIG. 13 represents the evolution of absorbance as a function of the wavelength of the incident beam in a diffuse resonance spectroscopy analysis of a concrete including a magnetically treated red iron oxide pigment dispersion.

Both concrete samples are crushed in order to analyse the colour by diffuse reflectance spectroscopy (hereinafter referred as DRS), using a Cary 5 photospectrometer commercially available from Varian Techtron Pty. Limited (Melbourne, Victoria, Australia) allowing to quantify the amount of radiation absorbed by the sample, which can be related to the colour of the sample. The effect of magnetic treatment on the colour of the concrete mixture is shown in FIG. 13 showing the Kubelka-Munk absorbance (being the ratio of the absorbed intensity to the reflected intensity of radiation) as a function of the wavelength of the incident beam between 200 nm and 750 nm. FIG. 13 clearly demonstrates that the absorption of UV and visible light with shorter wavelengths (mainly between about 200 nm and 500 nm) is improved by the magnetic treatment of the yellow iron oxide pigment dispersion. The following table provides an overview of the more significant changes, in the form of percentages.

| wavelength (nm) | colour | change in absorbance |
| --- | --- | --- |
| 700 | red | −2.4% |
| 620 | orange | −1.6% |
| 580 | yellow | −1% |
| 530 | green | 2% |
| 470 | blue | 12% |
| 420 | violet | 18% |
| 370 | lower limit | 23% |

These more significant changes are responsible for an increase of the intensity of the colour of the treated concrete sample including the magnetically treated pigment dispersion. The intensification of the colour upon treatment may be explained by means the particle size reduction already proven by dynamic light scattering. As a consequence of particle size reduction, dispersion of the pigment into the concrete sample will also be improved.

EXAMPLE 10

Magnetic Treatment of a Calcium Hydroxide Aqueous Suspension

Magnetic treatment of a calcium hydroxide aqueous suspension (average particle size 100 μm; concentration 20 g/L, i.e. 2% by weight) was effected in the reservoir system shown in FIG. 1B, under the same linear flow rate and residence time conditions as in example 4, except that the magnetic device comprised three identical magnets arranged in series and commercially available from CEPI-CO (Antwerp, Belgium) under the trade name "series W, SAN R1/2" D, each providing a strength of about 10,000 gauss.

Figure 14:
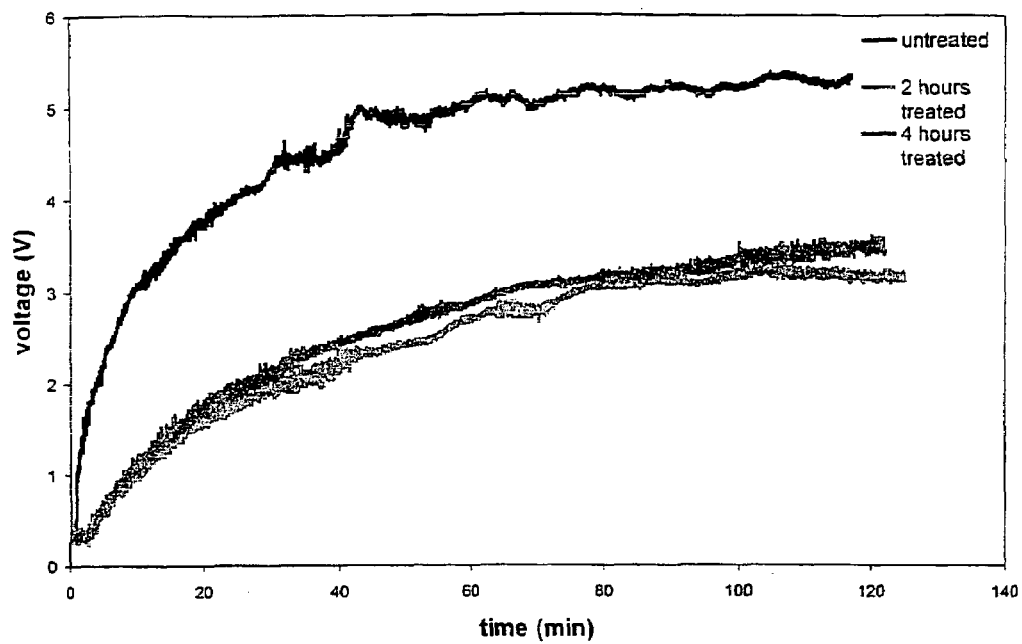
FIG. 14 represents the evolution, as a function of time, of the voltage measured in the turbidity determination of a calcium hydroxide suspension before and after magnetic treatments with various durations according to the invention.

The turbidity of the suspension before and after treatment was monitored by means of the turbidimeter shown in FIG. 15 and previously described in example 3. Particles settled under gravitation do not scatter the IR-beam from the turbidimeter. FIG. 14 shows the evolution of the voltage plotted against time. After 110 minutes the untreated sample is much less turbid than the 2 hours and 4 hours treated samples, meaning that the large particles in the untreated sample have settled, while after treatment, there is a significant fraction of particles that scatter the light but do not settle. The latter particles have sizes ranging from about 80 nm up to about 1 μm.

After 110 minutes, the voltage measured in the untreated sample is 5.3 V, whereas it is 3.22 V after 2 hours treatment and 3.48 V after 4 hours treatment, i.e. the sample was 39% more turbid after 2 hours treatment and 34% more turbid after 4 hours treatment, compared to the untreated sample.

The invention claimed is:

1. A method for reducing the average size of metallic compound particles or agglomerates suspended in a fluid by flowing one or more times said fluid having metallic compound particles or agglomerates suspended therein through one or more magnetic fields to reduce the average size of a substantial portion of the metallic compound particles are agglomerates by at least 25%, wherein said substantial portion is at least 20% by weight of said suspended particles or agglomerates, wherein the strength of each said magnetic field is at least 0.2 Telsa (2,000 gauss) and wherein the linear flow rate of said fluid flowing through each said magnetic field is between 0.25 and 25 m/s.

2. A method according to claim 1, wherein the strength of each said magnetic field is about 1 Tesla (10,000 gauss).

3. A method according to claim 1, wherein said metallic compound is selected from the group consisting of metal oxides, metal hydroxides, metal sulfides, metal selenides, metal tellurides and combinations thereof.

4. A method according to claim 1, wherein said metallic compound is a metal organic or inorganic salt or a metal complex salt.

5. A method according to claim 1, wherein the average size of said metallic compound agglomerates before performing said method is in a range from 10 μm to 100 μm, and wherein the average size of said substantial portion of said metallic compound agglomerates after performing said method is reduced to a range from 0.45 μm to 5 μm.

6. A method according to claim 1, wherein the average size of said metallic compound particles before performing said method is in a range from 0.5 μm to 10 μm, and wherein the average size of said substantial portion of said metallic compound particles after performing said method is reduced to a range from 0.5 nm to 500 nm.

7. A method according to claim 1, wherein said fluid is a liquid and wherein said metallic compound particles or agglomerates are suspended in said liquid in the form of a slurry and the concentration of said metallic compound particles or agglomerates in said fluid is at least two times the solubility limit of said metallic compound in said fluid under the physical (temperature, pressure) and chemical (pH) conditions prevailing while flowing said slurry through said magnetic field.

8. A method according to claim 1, wherein said fluid is a liquid and said metallic compound is calcium carbonate, wherein said calcium carbonate particles or agglomerates are suspended in said liquid in the form of an aqueous slurry and wherein the concentration of said calcium carbonate particles or agglomerates in said aqueous slurry is from 50 mg/L to 15 g/L.

9. A method according to claim 1, wherein said fluid is a liquid and said metallic compound is calcium hydroxide, wherein said calcium hydroxide particles or agglomerates are suspended in said liquid in the form of an aqueous slurry and wherein the concentration of said calcium hydroxide particles or agglomerates in said aqueous slurry is from 2% to 15% by weight.

10. A method according to claim 1, wherein said fluid includes one or more surfactants in an amount suitable for producing surfactant-capped nanoparticles.

11. A method according to claim 1; wherein the average size of the substantial portion of metallic compound particles or agglomerates is reduced by at least 50%.

12. An industrial process involving the use of metallic compound particles or agglomerates, comprising a step of reducing by at least 25% the average size of a substantial portion of said metallic compound particles or agglomerates, wherein said step includes a method comprising suspending metallic compound particles or agglomerates in a fluid and flowing one or more times said fluid having metallic compound particles or agglomerates suspended therein through one or more magnetic fields to reduce the average size of a substantial portion of the metallic compound particles or agglomerates by at least 25%, wherein said substantial portion is at least 20% by weight of said suspended particles or agglomerates, wherein the strength of each said magnetic field is at least 0.2 Tesla (2,000 gauss) and wherein the linear flow rate of said fluid through each said magnetic field is between 0.25 and 25 m/s.

13. An industrial process according to claim 12, wherein said process further comprises one or more post-processing steps performed following the size reducing step.

14. An industrial process according to claim 12, wherein said process further comprises a heating step performed following the size reducing step, wherein said metallic compound is a metal hydroxide and further wherein said heating step raises the temperature of the particles or agglomerates with reduced size sufficiently for converting said metal hydroxide into the corresponding metal oxide.

15. An industrial process according to claim 12, wherein said process further comprises a drying step performed following the size reducing step for substantially removing the fluid in which the metallic compound particles or agglomerates are suspended during the size reducing step.

16. An industrial process according to claim 12, wherein said process further comprises, following the size reducing step, a step of mixing an adjuvant together with the particles or agglomerates with reduced size.

17. An industrial process according to claim 12, wherein said process further comprises, following the size reducing step:
   a drying step for substantially removing the fluid in which the metallic compound particles or agglomerates are suspended during the size reducing step, and
   a step of mixing an adjuvant together with the dried particles or agglomerates with reduced size.

18. An industrial process according to claim 12, wherein said process further comprises, following the size reducing step, a sonication step.

19. A method according to claim 12; wherein the average size of the substantial portion of metallic compound particles or agglomerates is reduced by at least 50%.

* * * * *

UNITED STATES PATENT AND TRADEMARK OFFICE
CERTIFICATE OF CORRECTION

PATENT NO. : 7,384,560 B2 Page 1 of 1
APPLICATION NO. : 10/505790
DATED : June 10, 2008
INVENTOR(S) : Johan Martens, Gina Vanbutsele and Roger Vermeiren It is certified that error appears in the above-identified patent and that said Letters Patent is hereby corrected as shown below:

Title Page, Item (56) Under References Cited, Under OTHER PUBLICATIONS, in "Cul and Hahn," replace "Tempatures"" with --Temperatures,"--.

Column 21, Line 15, In claim 1, replace "are" with --or--.

Signed and Sealed this

Fourteenth Day of October, 2008

JON W. DUDAS
*Director of the United States Patent and Trademark Office*